United States Patent

Iwanaga

[11] Patent Number: 5,889,744
[45] Date of Patent: Mar. 30, 1999

[54] MAGNETO-OPTICAL DISK RECORDING DEVICE AND CAPABLE OF VERIFYING RECORDED STATE DURING RECORDING AND CHECKING ERASED STATE DURING ERASING

[75] Inventor: Toshiaki Iwanaga, Tokyo, Japan

[73] Assignee: NEC Corporation, Tokyo, Japan

[21] Appl. No.: 898,680

[22] Filed: Jul. 22, 1997

Related U.S. Application Data

[62] Division of Ser. No. 602,071, Feb. 15, 1996, Pat. No. 5,708,639.

[30] Foreign Application Priority Data

Feb. 16, 1995 [JP] Japan ........................... 7-27817

[51] Int. Cl.⁶ ........................................... G11B 3/90
[52] U.S. Cl. ................................................. 369/54
[58] Field of Search ........................ 369/13, 47–48, 369/50, 54, 58, 59, 100, 110, 116

[56] References Cited

U.S. PATENT DOCUMENTS

| | | | |
|---|---|---|---|
| 4,648,085 | 3/1987 | Shimonou | 369/54 |
| 4,727,531 | 2/1988 | Ito et al. | 369/58 |
| 5,341,359 | 8/1994 | Birukawa et al. | 369/13 X |
| 5,428,586 | 6/1995 | Kobayashi et al. | 369/13 |
| 5,517,471 | 5/1996 | Ashinuma et al. | 369/54 |
| 5,563,851 | 10/1996 | Yamazaki | 369/13 |
| 5,646,924 | 7/1997 | Nonoyama et al. | 369/58 |

FOREIGN PATENT DOCUMENTS 57-212629 12/1982 Japan.
5-62273 3/1993 Japan.

OTHER PUBLICATIONS

Patent Abstracts of Japan, vol. 14, No. 376, P1092, & JP2–139,738, Aug. 14, 1990.

*Primary Examiner*—W. R. Young
*Attorney, Agent, or Firm*—Young & Thompson

[57] ABSTRACT

The magneto-optical disk recording device disclosed is for recording and reproduction using a one-beam optical head and includes a magneto-optical head, a reproduction amplifier, a recording data delay circuit, a recording state detection circuit, a data comparator circuit, and a record judging circuit. The reproduction amplifier amplifies a magneto-optical reproduction signal read out by the magneto-optical head during the recording. The recording data delay circuit delays a recording data for a predetermined period of time. The recording state detection circuit receives the reproduction signal from the reproduction amplifier and detects a reproduced signal state during the recording. The data comparator circuit receives and compares an output of the recording data delay circuit and an output of the recording state detection circuit, and outputs a record failure signal. The record judging circuit judges whether to skip a record failure region or to verify a recorded state of the data when the record failure signal is outputted from the data comparator circuit. The arrangement enables the verification operation during the recording to be made simple thereby enhancing a recording speed.

2 Claims, 6 Drawing Sheets

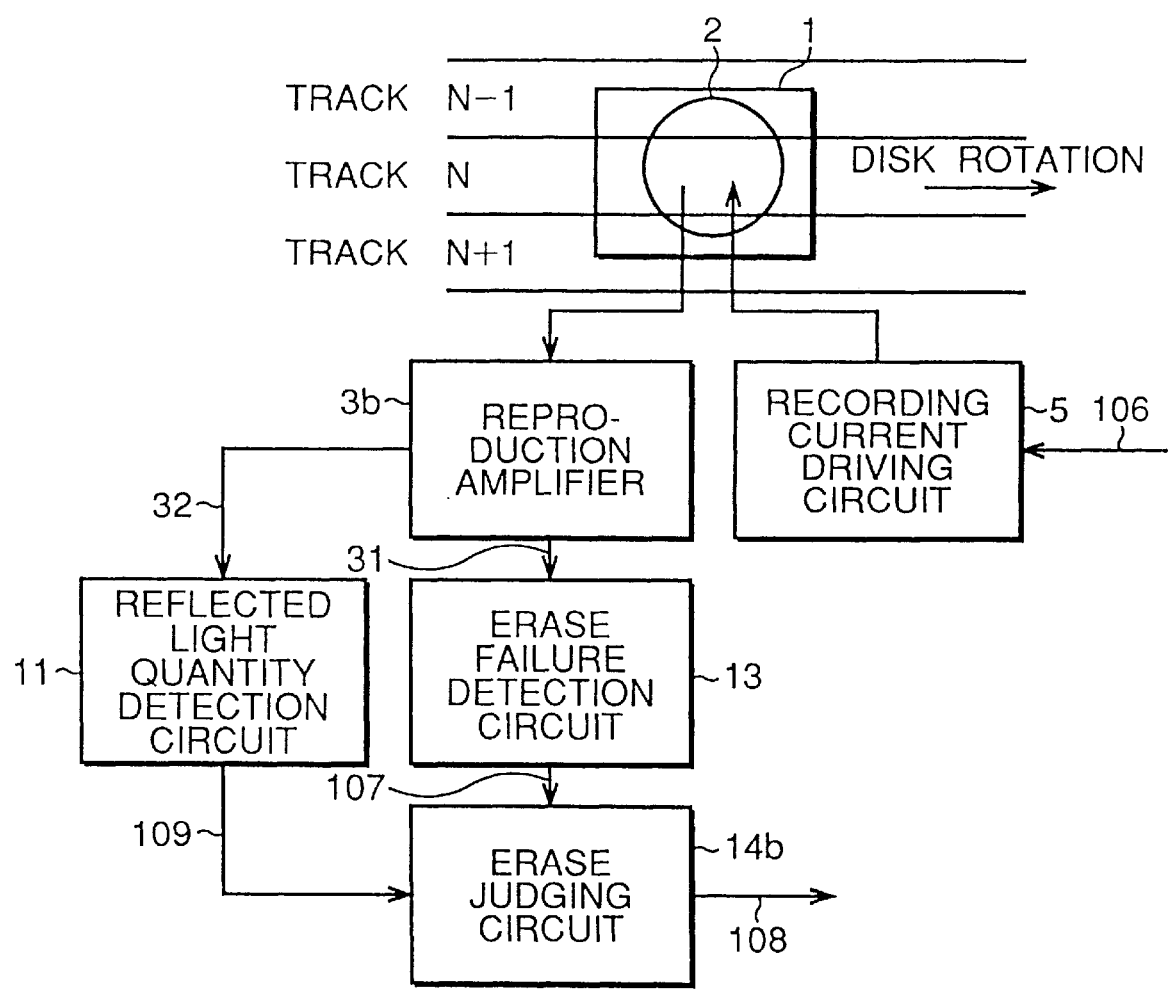

MAGNETO-OPTICAL DISK RECORDING DEVICE AND CAPABLE OF VERIFYING RECORDED STATE DURING RECORDING AND CHECKING ERASED STATE DURING ERASING

This application is a division of application Ser. No. 08/602,071, filed Feb. 15, 1996, now U.S. Pat. No. 5,708,639.

BACKGROUND OF THE INVENTION (1) Field of the Invention

The present invention relates to a magneto-optical disk recording device, and more particularly to a magneto-optical disk recording device with means for verifying a recorded state during the recording and checking an erased state during the erasing in the magneto-optical disk.

(2) Description of the Related Art

In an optical disk medium, especially in a magneto-optical disk recording device which uses a magneto-optical disk medium typically represented by an erasable optical disk medium, a laser beam is converged and irradiated along a groove (guide groove) provided in advance on a magneto-optical disk medium formed of a thin magnetic film, thus magnetically recording data as magnetic patterns on the magneto-optical disk medium.

The groove is provided in a spiral form and, in the case of the magneto-optical disk medium, the groove is utilized for positioning a magnetic head to an adjacently located land region serving as a data track. In the data track, a sector format region for sector data is written in advance as a sector head region. In the magneto-optical disk recording device, the recording/reproduction of data starts upon the recognition of the pre-format. Conventionally, there are various methods for recording and reproducing data in the data regions that are divided into sectors. For example, in a 5-inch magneto-optical disk recording device, a mark position recording system is used for the recording. In this system, the recording is made by making the center of the recording pit hold data in accordance with binary data. In the re-recognition of the data to be reproduced, the read signal is differentiated and the zero cross point is detected. At the same time, the reproduction clock determined by the modulation system is extracted, and the pattern of "0" or "1" is judged from the timing relationship with respect to data detection windows, thus carrying out the reproduction of the original data.

Further, for the magneto-optical disk recording device for carrying out recording and reproduction of a large volume of data, there is research and development on a mark-edge recording system in which edges of the recording pit are made to hold data for the purpose of increasing the recording capacity. As for this system, it is known that the recording density can ideally be doubled as compared with the mark position recording system. During the reproduction, the edge data is detected normally by a fixed slice leveled pulsation and, simultaneously with this, the reproduction clock determined by the modulation system is extracted, and the pattern of "0" or "1" is judged from the timing relationship with respect to data detection windows, thus carrying out the reproduction of the original data.

With respect to the present-day magneto-optical disk recording device, for the reasons that the device lacks an overwrite function unlike in the magnetic recording device and that the device is easily contaminated with dirt or such damages as scratches, it is the practice to make the verification during the data recording in order to ensure the reliability of the recorded data. However, the read waveforms during the recording are different from the read waveforms during the normal reproduction so that, according to the conventional reproduction signal detection method, it has not been possible to detect the reproduction signal during the recording. Thus, the current process requires three steps, namely, data erasing, data recording and recorded data verification (the time period corresponding to three rotations of the disk) resulting in the problem that high speed recording is not possible. Recently, a magneto-optical disk medium having an overwrite function has been developed, and hence the standardization of the next generation optical disk medium is under consideration. However, in this case, only costly devices or systems have been proposed wherein, for example, the optical head has two-beam configuration or two optical head configuration for the verification.

A prior art magneto-optical disk recording device having a verification function is shown by a block diagram in FIG. 1.

The prior art device shown in FIG. 1 employs a two-beam optical head 1' with a reproduction beam 20 and a recording beam 2'. This example relates to a case where the recording is made on a track N. The recording data 101' is mark-edge recorded on a magneto-optical disk medium by the recording beam 2' through a recording current driving circuit 5'. The recorded data is read by the reproduction beam 20 and is outputted to a reproduction amplifier 3'. At the reproduction amplifier 3', the reproduced signal is amplified and is outputted to a clock extraction circuit 21 and a reproduced data detection circuit 22. At the clock extraction circuit 21, the clock extraction from the reproduced signal is carried out, and the reproduction clock 100' is outputted to the reproduced data detection circuit 22, a recording data delay circuit 6' and a data comparator circuit 7'. At the reproduced data detection circuit 22, the reproduced signal amplified by the reproduction amplifier 3' is converted to a binary signal, is latched by the reproduction clock 100' from the clock extraction circuit 21, and is outputted to the data comparator circuit 7'. The data comparator circuit 7' receives a delayed recording data 102', which has been timing-adjusted by the reproduction clock 100', from the recording data delay circuit 6', and an output 103' from the reproduced data detection circuit 22, compares these data, and outputs a verify error signal 104'. At a record judging circuit 8', when the verify error signal 104' is outputted from the data comparator circuit 7', it is judged whether the recorded state of the data signal recorded on the magneto-optical disk medium requires verification. Then, the record judging circuit 8' outputs a record judging signal 105' to the system side.

The deficiency in the above system is that the two-beam optical head has a problem in positioning the beams at the recording track, or that the need for the reproduction clock extraction inevitably requires a complex construction. Thus, the problem remains that the system requires a recording time of more than two times as compared with the magnetic disk device.

A prior art example in which it is attempted to reduce the time required in making verification during the recording in a magneto-optical disk so as to shorten the recording time, is disclosed in Japanese Patent Application Kokai Publication No. Hei 5-62273. In this example, the level of the reproduction signal ("RF signal" in the reference) from the optical head during the recording is detected by a level detection circuit. Here, the verification is made only when this reproduction signal level has become a level lower than a predetermined level. Since no verification is made when the level is above the predetermined level, that is, not all recorded data are verified, it is said that the recording time is shortened.

Another prior art example which does not relate to a magneto-optical disk medium but relates to a write once read many type optical disk is disclosed in Japanese Patent Application Kokai Publication No. Sho 57-212629. In this example, the verification is made by monitoring the quantity of reflected light during the recording.

The above method in which the quantity of reflected light is monitored is effective in determining whether to re-verify or whether to transfer a defective portion to a replacement sector, but there are still problems as explained below.

That is, since the verification depends on changes in the quantity of the reflected light, the change in the reflected light caused by contaminants such as grease or dirt adhering to the surface of the optical disk leads directly to the determination that there is a defect. However, as is apparent from the performance index defined approximately by the product of "the square root of the reflectivity from the optical disk medium" and "the Kerr rotation angle", it is known that the lowering of the reflectivity leads to an increase in the Kerr rotation angle. Here, the verification is made directly based on the change in the reflectivity as being the existence of defects, and this presents a problem in the verification reliability.

Further, in the conventional magneto-optical disk recording device in which the verification is made during the recording only by checking the quantity of the reflected light, there remains a possibility that the presence of a minute scratch on the magneto-optical disk medium or a stain on a surface of the medium that is not a problem in practice is erroneously recognized as being a problem. This makes the verification during the recording meaningless, thus affecting the efficiency of the operation for a reason such as necessitating a further precise verification to be carried out after more than one cycle of the disk rotation from the start of the data recording.

Also, in the conventional magneto-optical disk recording device where only the quantity of the reflected light is relied upon as explained above, it is impossible to make the checking of defective erasing so that there is a possibility that the recording is made at a defective portion, leading to a problem of the lowering of throughput of the device.

The prior art includes a proposal of a system wherein a magneto-optical reproduction signal is detected by a level detection circuit during the recording, which is disclosed in Japanese Patent Application Kokai Publication No. Hei 5-62273. This proposal relates to a method in which the detection is not made on a bit-by-bit basis but is made to detect a reproduction signal level (an envelope level in which a change with time is long) by a fixed threshold level. Thus, the detected signal cannot be regarded as representing an exact bit-by-bit recording state, and the detection is of low accuracy. With the method with which whether or not a reproduction signal level is above a predetermined level is judged, there is a problem that, where the recording power becomes large, it is possible for a bit involving a recording error to be incorrectly recognized as being normal. In the proposed example, since the fixed threshold level is used for the judgment, there is a problem that, when an envelope DC change caused by a birefringence inherent to the magneto-optical system has occurred, there is a possibility for the abnormal recording to be recognized as being normal.

SUMMARY OF THE INVENTION

An object of the invention, therefore, is to overcome the problems existing in the prior art, and to provide a magneto-optical disk recording device with which the verification operation during the recording is simplified thereby enhancing recording speed.

According to one aspect of the invention, there is provided a magneto-optical disk recording device for recording and reproducing by an optical beam in magnetized series of pits in a magneto-optical disk medium, the device comprising:

a magneto-optical head for recording a recording data on and reproducing a recorded data from the magneto-optical disk medium;

a reproduction amplifier for amplifying a magneto-optical reproduction signal read out by the magneto-optical head during the recording;

a recording data delay circuit for delaying the recording data for a predetermined period of time;

a recording state detection circuit for receiving the amplified reproduction signal from the reproduction amplifier and detecting a reproduction signal state during the recording;

a data comparator circuit for outputting a record failure signal derived from comparison between an output of the recording data delay circuit and an output of the recording state detection circuit; and a record judging circuit for judging whether to skip a record failure region or to verify a recording state of the recorded data when the record failure signal is outputted from the data comparator circuit.

According to another aspect of the invention, there is provided a magneto-optical disk recording device for recording and reproducing by an optical beam in magnetized series of pits in a magneto-optical disk medium, the device comprising:

a magneto-optical head for recording a recording data on and reproducing a recorded data from the magneto-optical disk medium;

a reproduction amplifier for amplifying both a magneto-optical reproduction signal and a reflected light quantity signal read out by the magneto-optical head during the recording;

a recording data delay circuit for delaying the recording data by a predetermined period of time;

a recording state detection circuit for receiving a magnetic data output from the reproduction amplifier and detecting a reproduced signal state during the recording;

a data comparator circuit for outputting a record failure signal derived from an output of the recording data delay circuit and an output of the recording state detection circuit;

a reflected light quantity detection circuit for outputting a reflected light quantity detection signal when a reflected light quantity signal outputted from the reproduction amplifier has become a level lower than a predetermined threshold level; and a record judging circuit for judging whether to skip a record failure region or to verify a recorded state of the recorded data when at least one of the record failure signal from the data comparator circuit and the reflected light quantity detection signal from the reflection light quantity detection circuit is outputted.

The magneto-optical reproduction signal to be read out by a recording beam during the recording is read by a differential amplitude reproduction amplifier even when the recording power is being irradiated on the magneto-optical disk medium so that the state of thermal magnetic recording is accurately detected as a variation in the approximate product of the square root of the reflectivity and the Kerr rotation angle. Also, in the case of the magneto-optical recording, the thermal level of the recording data is maintained and observed due to the effect of the thermal conduction even after the recording power is shut off (immediately after the restoration to the reproduction power). Therefore, it is possible to measure the necessary condition as to whether the thermal magnetic recording has been effected. Needless to say that, in order to measure the required conditions, it is necessary to make the actual data reproduction by the reproduction power after the thermal magnetic recording has been completed.

Where the verification is made during the recording by checking only the reflected quantity of light, there remains a possibility that even a minute scratch on the disk medium or a stain on a surface thereof which in practice is not of a problem can be erroneously recognized as being a problem. However, where the verification is made during the recording by using the magneto-optical reproduction signal produced during the recording, it can be confirmed whether the thermal magnetic recording has been effected. For example, if the magnetic film is peeled off or corroded for some reason, the recording failure can be confirmed by monitoring the magneto-optical reproduction signal produced during the recording and this can be verified during the recording.

When a recording failure has occurred, there should be, basically, no change in the quantity of the reflected light. Thus, the above explained method, as compared with one which depends solely on the quantity of the reflected light for verification, has a better effect on the enhancement of the reliability.

Also, even when the optical head is deteriorated and the converged beam is irradiated on the magneto-optical disk medium in a defocused state, there is a possibility for the quantity of the light reflected from the magneto-optical disk medium to be outputted as normal, leading to the judgment that there is no need to make the verification. However, according to the present invention, in the verification by the magneto-optical reproduction signal during the recording, a temperature rise in the magnetic thin film can be detected so that the reliability in the verification is enhanced.

Further, according to the invention, the checking of the magnetic thin film can be made also during the erasing operation, and this provides advantages that the replacement sector can be easily controlled so that the reliability of the magneto-optical disk medium is enhanced, and the efficiency and the operation speed of the device are improved.

BRIEF DESCRIPTION OF THE DRAWINGS

The above and other objects, features and advantages of the present invention will be apparent from the following description of preferred embodiments of the invention explained with reference to the accompanying drawings, in which:

FIG. 7 is a block diagram showing a magneto-optical disk recording device of a fourth embodiment according to the invention.

PREFERRED EMBODIMENTS OF THE INVENTION

Now, preferred embodiments of the invention are explained with reference to the drawings.

Figure 1:
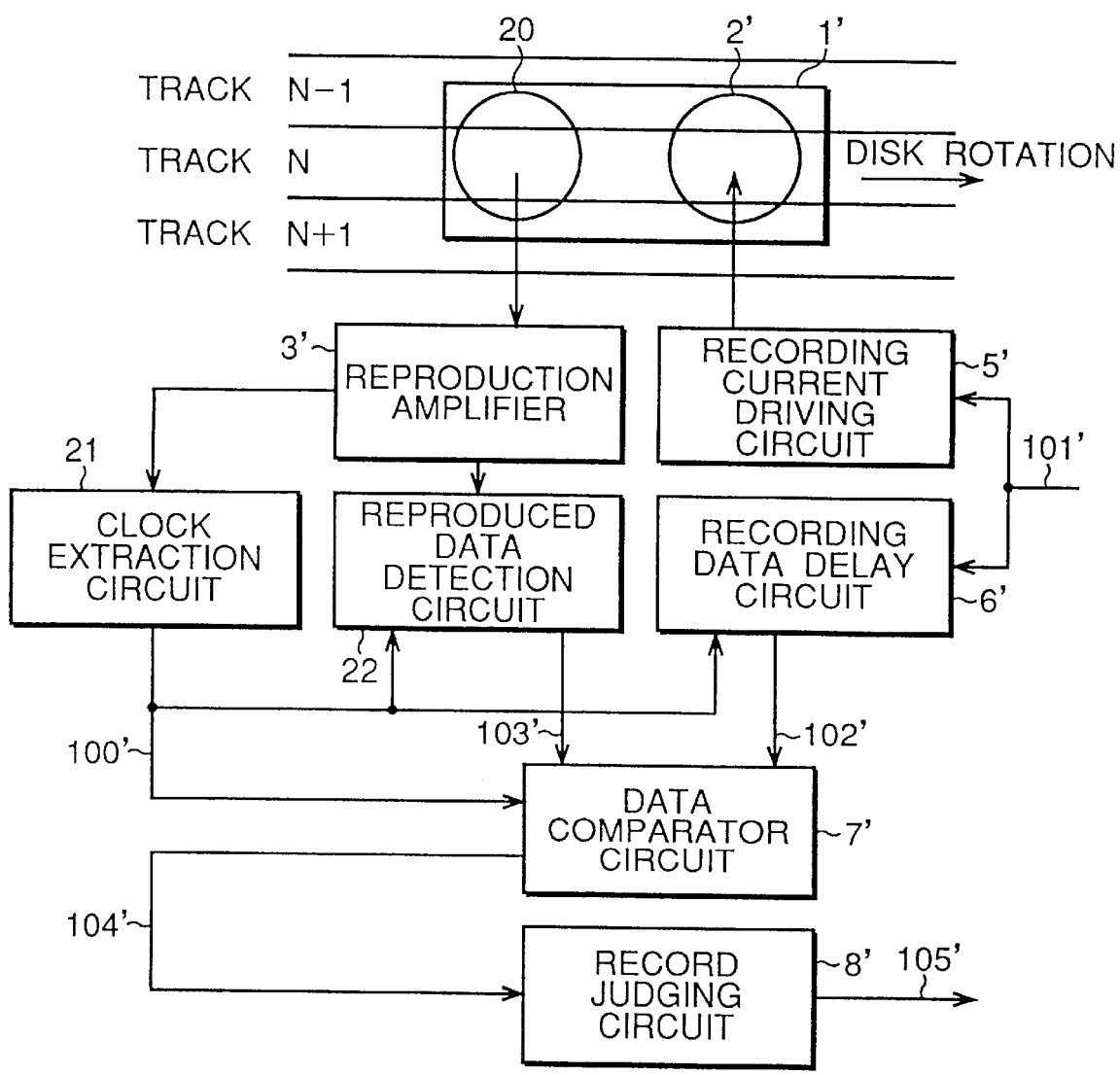
FIG. 1 is a block diagram showing a prior art magneto-optical disk recording device.
Figure 2:
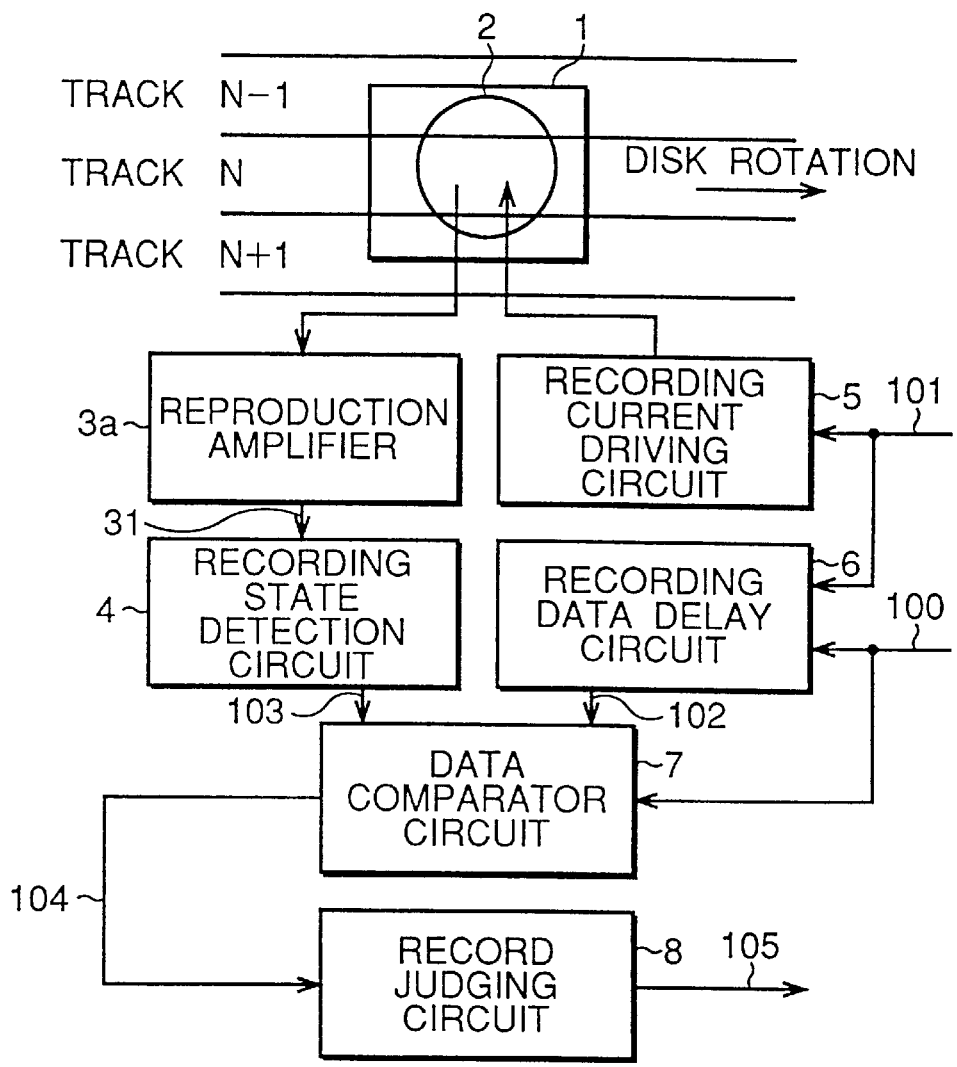
FIG. 2 is a block diagram showing a magneto-optical disk recording device of a first embodiment according to the invention.

FIG. 2 shows, in a block diagram, a magneto-optical disk recording device of a first embodiment according to the invention.

In the read operation, a normal one-beam optical head 1 is used. This example is the case where the writing is made in the track N. By using a mark edge recording method with, for example, (1, 7) modulation, recording data 101 which is synchronized with a recording clock 100 is recorded on a magneto-optical disk medium by a recording beam 2 through a recording current driving circuit 5. At the same time, at a reproduction amplifier 3a of a differential type, a magneto-optical data light (magneto-optical reproduction signal) during the recording is monitored, and this signal is amplified and is outputted as a reproduction signal 31 to a recording state detection circuit 4. This recording state detection circuit 4 outputs a recording state detection signal 103 which is derived from a peak amplitude at the starting of the recording of the recording data and an amplitude level after the lapse of a predetermined time therefrom. A data comparator circuit 7 receives recording data 102 which is timing-adjusted by the recording clock 100 and the recording data delay circuit 6 and a recording state detection signal 103 which is an output from the recording state detection circuit 4, and outputs a record failure signal 104 after comparing the received data. At the record judging circuit 8, the judgment is made, when the record failure signal 104 outputted from the data comparator circuit 7, as to whether the record failure region is to be skipped so as to prepare a replacement sector, or the recording state of the data signal recorded on the magneto-optical disk medium is to be accurately verified, and the record judging signal 105 is outputted to the system side.

Figure 3:
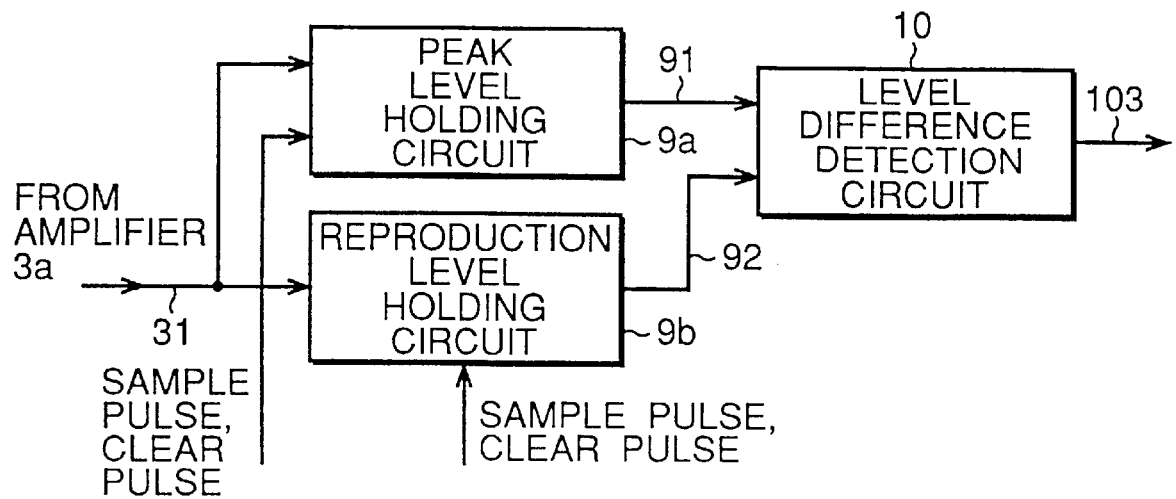
FIG. 3 is a block diagram showing an example of recording state detection circuit used in the device shown in FIG. 2.

FIG. 3 shows, in a block diagram, an example of the recording state detection circuit 4 used in this embodiment of the invention as shown in FIG. 2.

The recording state detection circuit is constituted by a peak level holding circuit 9a which receives the reproduction signal 31 from the reproduction amplifier 3a and holds for a predetermined time period a peak level VPW 91 at the starting of the recording of each recording mark; a reproduction level holding circuit 9b which holds a reproduction amplitude level VW 92 during the recording after the lapse of, for example 0.5 T (T being a clock cycle time of (1, 7) modulation); and a level difference detection circuit 10 which receives the peak level VPW 91 from the peak level holding circuit 9a and the reproduction amplitude level VW 92 during the recording of the reproduction level holding circuit 9b and outputs the recording state detection signal 103. The peak level holding circuit 9a may be constituted by, for example, a peak holding circuit which holds for a predetermined time period the peak level by a sample pulse and a clear pulse produced by a recording data and a recording clock. The reproduction level holding circuit 9b may be constituted by, for example, a sample holding circuit which holds for a predetermined period of time the amplitude level by a sample pulse and a clear pulse produced by, for example, a recording data and a recording clock. The level difference detection circuit 10 may be constituted by, for example, a differential amplifier and a comparator having a predetermined threshold level.

Figure 4:
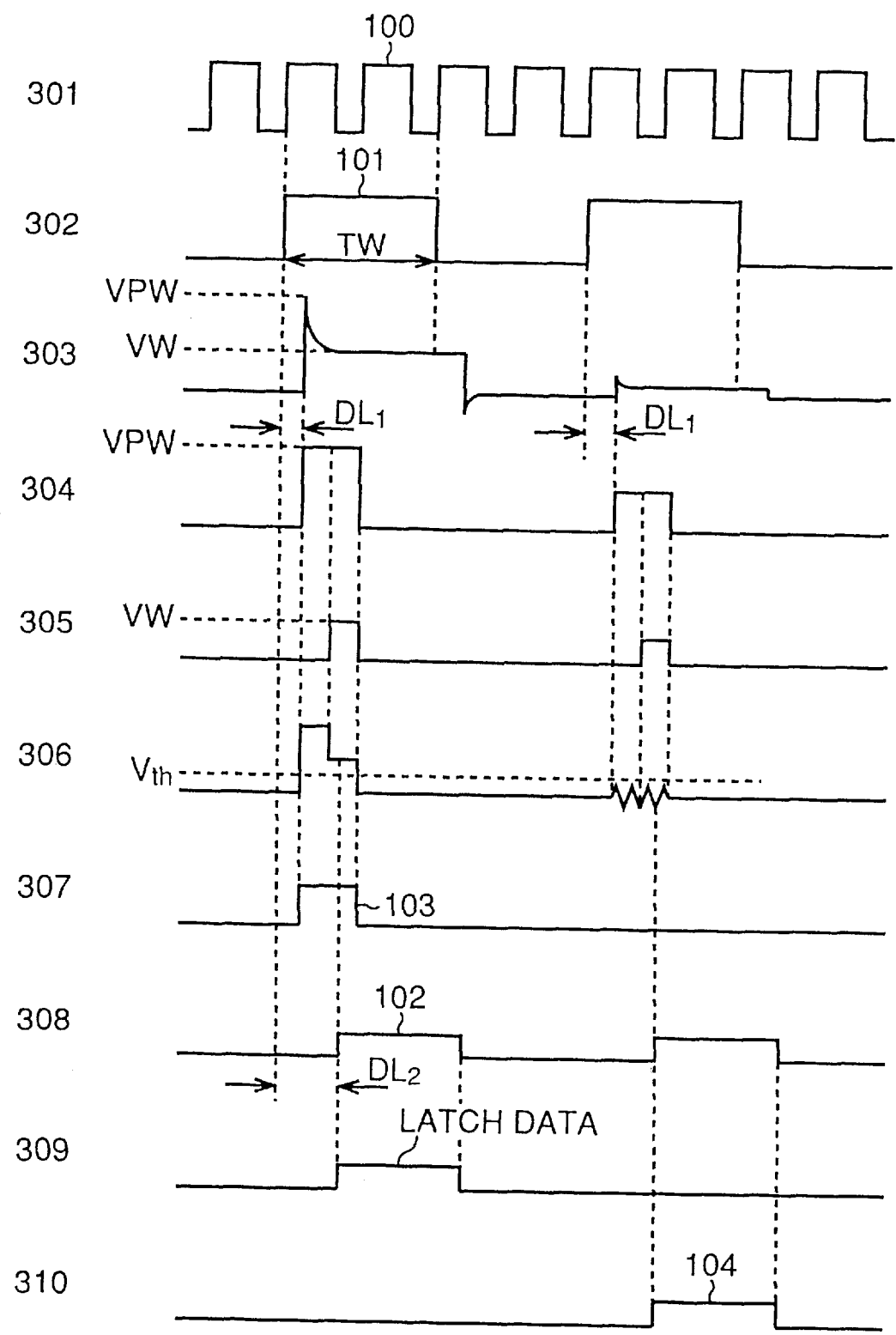
FIG. 4 is a timing chart for use in explaining a verifying operation of the device of the first embodiment according to the invention.

FIG. 4 is a timing chart for use in explaining the verifying operation, during the recording, of the device described with reference to FIGS. 2 and 3.

Here, a DC amplifier is used for the reproduction amplifier 3a, and a 2 T mark of (1, 7) modulation is used for the recording mark.

Recording data 101 which is synchronized with the recording clock 100 shown by 301 and which has a data width TW (2 T mark) shown by 302 is recorded on the magneto-optical disk medium. Thereafter, the reproduction signal 31 outputted from the reproduction amplifier 3a shown in FIG. 2 is monitored as a reproduction signal during the recording in the recording state as shown by 303 which is, due to the thermal magnetic recording on the magneto-optical disk medium, a product of the square root of the quantity of the light reflected from the magneto-optical disk medium and the Kerr rotation angle. At the rise corresponding to the recording data 101 which is delayed by $DL_1$ by a circuit such as the reproduction amplifier 3a, the amplitude rises because the recording power rises more quickly than the rise of temperature on the medium. Subsequently, as the temperature on the medium rises, the Kerr rotation angle is reduced, so that the signal amplitude has a waveform with a peak level (VPW) and becomes a VW level abruptly. At the ending point of the recording mark, the recording power quickly returns to the reproduction power, but the temperature on the medium remains in the raised state so that a small peak level exists in the direction opposite to the VPW. This is positive evidence that the thermal magnetic recording is taking place on the magneto-optical disk medium. These signal amplitudes of the VPW and the VW are, as shown by 304 and 305, held by the peak level holding circuit 9a and the reproduction level holding circuit 9b of the recording state detection circuit 4 shown in FIGS. 2 and 3, resulting in the level differential signal as shown by 306 which is outputted as a recording state detection signal 103 shown by 307 due to a comparator threshold level $V_{th}$. The data comparator circuit 7 shown in FIG. 2 is constituted by a circuit to output a latch data and an exclusive OR circuit. In the former circuit, the detected recording state detection signal 103 is latched by edges of the delayed recording data 102 outputted after being delayed by the extent of $DL_2$ from the recording data delay circuit 6 shown by 308, and the latch data is outputted as shown by 309. Thus, in correspondence to the recording data position at which the failure of the recording has occurred (in a case such as when the temperature of the medium has not risen), the record failure signal 104 shown by 310 is outputted. Here, the latching time is to come after, for example, the center point of the recording state detection signal 103.

Figure 5:
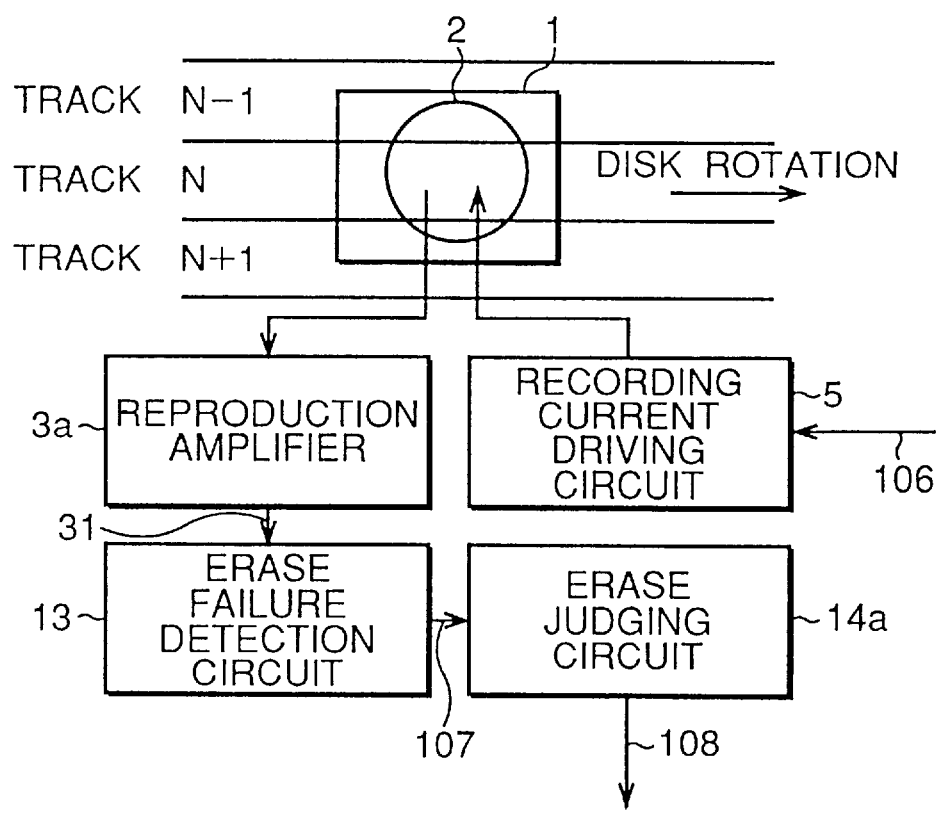
FIG. 5 is a block diagram showing a magneto-optical disk recording device of a second embodiment according to the invention.

Now, a second embodiment of the invention is explained. FIG. 5 shows, in a block diagram, a magneto-optical disk recording device of the second embodiment according to the invention.

Whereas in the first embodiment the verification is made during the recording, this second embodiment is one in which the magneto-optical state is checked during the erasing of the recorded data or during the initialization of the medium. Thus, an erasing signal 106 is inputted to the recording current driving circuit 5 and, when an erase failure signal 107 is outputted from an erase failure detection circuit 13, an erase judging circuit 14a judges whether to skip an erase failure region or to re-erase and confirm the erased state. Then, the erase judging circuit 14a outputs an erase judging signal 108 to the system side.

That is, the reproduction amplifier 3a monitors the magneto-optical reproduction signal and outputs it to the erase failure detection circuit 13. The reproduction signal 31 during the erasing can be monitored by the amplitude level which is opposite to that during the recording because the polarity of the external bias magnetic field is opposite to that during the recording. The erase failure detection circuit 13 outputs an erase failure signal 107 when the differential signal whose difference between the peak level VPE at the erase starting point and the amplitude VE of the reproduction signal 31 during the erasing becomes a level lower than the threshold level set in advance. The erase judging circuit 14a outputs an erase judging signal 108 after receiving the erase failure signal 107 and judging whether to skip the erase failure region or to re-erase and confirm the erased state.

Here, the erase judging circuit 14a is realized by, for example, a logic OR or AND circuit. The magneto-optical disk recording device is equipped with a replacement sector control mechanism (not shown) which attends to functions such as transferring of any failed portion to the replacement sector.

Figure 6:
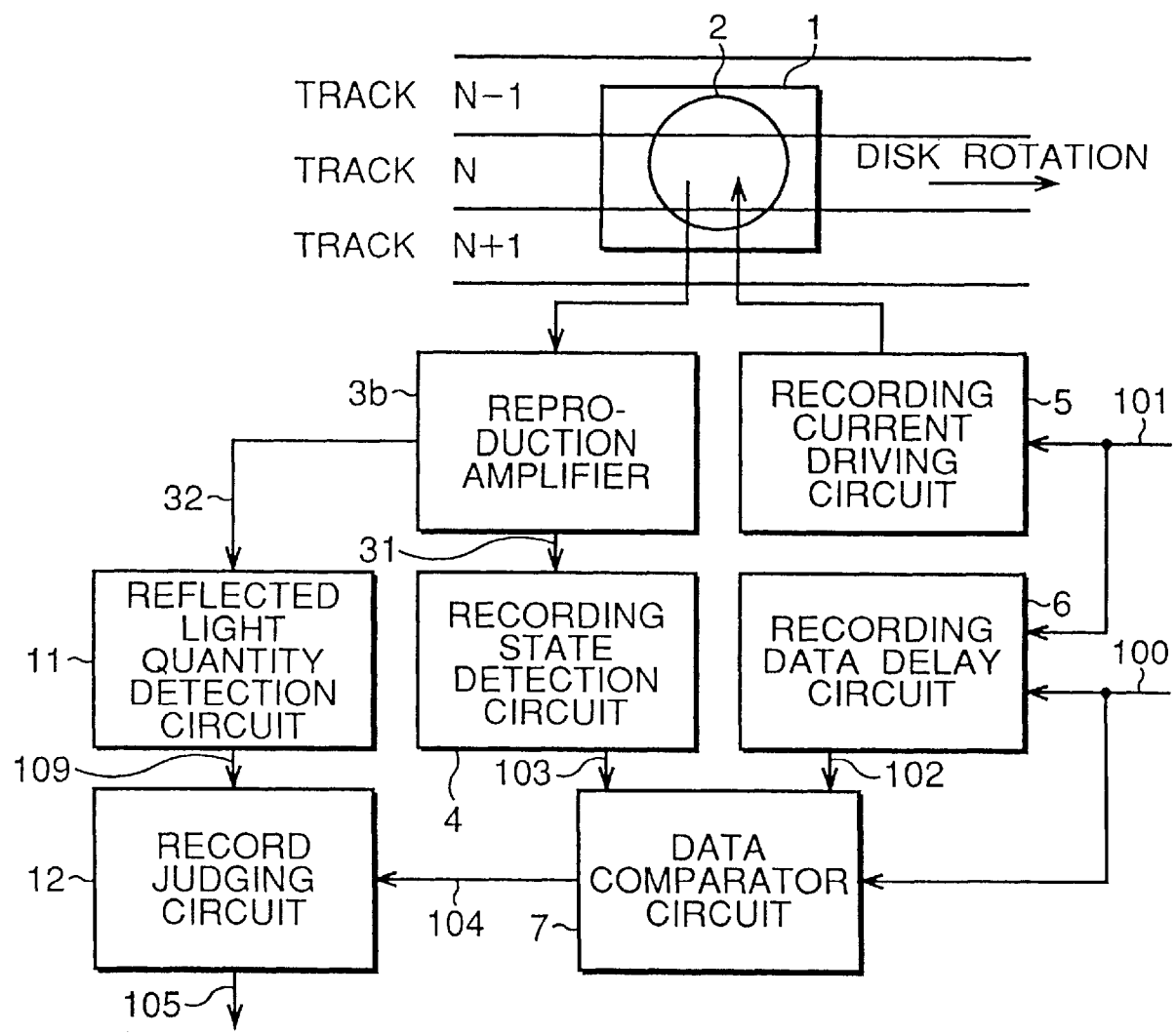
FIG. 6 is a block diagram showing a magneto-optical disk recording device of a third embodiment according to the invention.

Now, a third embodiment of the invention is explained with reference to FIG. 6 which shows, in a block diagram, a magneto-optical disk recording device of this embodiment.

The difference in this third embodiment compared with the first embodiment resides mainly in the provision of a reflected light quantity detection circuit 11 and a record judging circuit 12b. The reflected light quantity detection circuit 11 detects not only the magneto-optical reproduction signal but also the amplitude of a reflected light quantity signal (sum signal) 32 from the reproduction amplifier 3b and outputs a reflected light quantity detection signal 109 as a failure detected signal when the reflection quantity signal (sum signal) 32 has become a level lower than the predetermined threshold level. The record judging circuit 12b outputs the record judging signal 105 to the system side after judging whether to confirm the recording state of the data recorded on the magneto-optical disk medium when the record failure signal 104 has been outputted from a data comparator circuit 7, the reflected light quantity detection signal 109 has been outputted from the reflected light quantity detection circuit 11, or both these signals have been outputted.

That is, the reflected light quantity detection circuit 11 receives the reflected light quantity signal (sum signal) 32 outputted from the reproduction amplifier 3b, and detects by the predetermined threshold whether the reflected light quantity signal (sum signal) 32 is high or low. This can be judged by monitoring the amplitude level of the sum signal since, normally, in the disk region at which the level of the sum signal is lowered, there exists a problem caused by a scratch on the medium, grease or dirt on the surface of the medium, etc. Specifically, such a circuit configuration can be realized by, for example, a comparator. The record judging circuit 12b receives signals respectively from the reflected light quantity circuit 11 and the data comparator circuit 7, and judges whether the verification is necessary for the magneto-optical disk recording device. Specifically, such a circuit may be realized by a logical OR or AND circuit. In the case of the OR circuit, when an error is detected either through the sum signal or the magneto-optical signal, the accurate verification is made after a delay of at least one cycle. In the case of the AND circuit, when an error is detected through both the sum signal and the magneto-optical signal, the accurate verification is made. Of course, instead of the verification, the transferring may be made to the replacement sector. Which of the alternatives is to be selected may depend on the applications or uses of the magneto-optical disk recording device and on the cost and reliability aspects.

Now, a fourth embodiment of the invention is explained with reference to FIG. 7 which shows, in a block diagram, a magneto-optical disk recording device of this embodiment.

The difference in this fourth embodiment compared with the second embodiment resides mainly in the provision of a reflected light quantity detection circuit 11 and an erase judging circuit 14b. The reflected light quantity detection circuit 11 detects not only the magneto-optical reproduction signal but also the amplitude of the reflected light quantity signal (sum signal) from the reproduction amplifier 3b.

Similarly as in the second embodiment, the erase failure detection circuit 13 outputs an erase failure signal 107 when the reproduction signal 31 has become a level lower than the predetermined threshold level. Also, similarly as in the third embodiment, the reflected light quantity detection circuit 11 outputs the reflected light quantity detection signal 109 as a failure detection signal when the reflected light quantity signal (sum signal) 32 has become a level lower than the predetermined threshold level. The erase judging circuit 14b outputs the erase judging signal 108 to the system side after judging whether to skip the erase failure region or to re-erase and confirm the erased state in a case where the erase failure signal 107 has been outputted from the erase failure detection circuit 13, the reflected light quantity detection signal 109 has been outputted from the reflected light quantity detection circuit 11, or both these signals have been outputted.

As explained above, the condition under which the recording is made in pits in the recording medium and the condition under which the erasing is made, that is, whether the conditions for the thermal magnetic recording are satisfied, are constantly monitored, and the judgment is made whether to verify the recorded data, or to transfer an erase failure region to the replacement sector.

In explaining the fourth embodiment, no reference has been made to a differential optical detection system or a single optical detection system, but each of these system can be used similarly for the verification during the recording or the erase checking during the erasing.

Also, although the explanation has been made on the mark-edge recording among various magneto-optical recording methods, the application is not limited thereto and can be similarly extended to other methods such as a conventional mark position recording. Needless to say that this embodiment may be applied to a direct over-write recording utilizing optical modulation or magnetic field modulation.

The magneto-optical disk recording device according to the invention does not require a clock extraction means for the verification, which enables the verification to be highly reliable. In the conventional verifying arrangement, however, it is necessary that a clock be extracted from a reproduction signal which is of a two-beam configuration and of a beam exclusively for reproduction, and the recorded data be delayed based on such extracted clock so as to detect the reproduced data precisely.

Further, the magneto-optical disk recording device according to the invention can be realized by one-beam configuration without changing a conventional optical head. Thus, it is possible to make a large reduction in the cost of devices or elements such as a reproduction beam head, a servo-circuit and a reproduction circuit. Also, since the verifying operation and the recording operation can be carried out simultaneously, the performance of the device capable of operating at high speed is enhanced.

Further, unlike in the conventional magneto-optical disk recording device in which, since the verification is made during the recording only by checking the quantity of the reflected light, there remains a possibility that the presence of such a minute scratch on the magneto-optical disk medium or a stain on a surface of the medium that is not a problem in practice is erroneously recognized as a problem, the device according to the invention is one in which the above problem can be avoided by a simple means and the throughput of the device is enhanced without an additional fabrication cost.

Also, in the magneto-optical disk recording device according to the invention, the erased state can be checked either during the erasing operation or during the initialization of the medium. Thus, the replacement sector can be easily controlled thereby enhancing the reliability of the magneto-optical disk medium and improving the efficiency and the operation speed of the device.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A magneto-optical disk recording device for recording and reproducing by an optical beam in magnetized series of pits in a magneto-optical disk medium, said device comprising:

a magneto-optical head for erasing a data recorded on said magneto-optical disk medium;

a reproduction amplifier for amplifying a magneto-optical reproduction signal read out by said magneto-optical head during the erasing;

an erase failure detection circuit for receiving the amplified magneto-optical reproduction signal from said reproduction amplifier, detecting a reproduction signal state during the erasing, and outputting an erase failure signal;

an erase judging circuit means for judging whether to skip an erase failure region or to re-erase and verify the erased state when said erase failure signal is outputted from said erase failure detection circuit.

2. A magneto-optical disk recording device for recording and reproducing by an optical beam in magnetized series of pits in a magneto-optical disk medium, said device comprising:

a magneto-optical head for erasing a datum recorded on said magneto-optical disk medium;

a reproduction amplifier for amplifying a magneto-optical reproduction signal read out by said magneto-optical head during the erasing;

an erase failure detection circuit for receiving the amplified magneto-optical reproduction signal from said reproduction amplifier, detecting a reproduction signal state during the erasing, and outputting an erase failure signal, said erase failure detecting circuit including a peak level holding circuit for receiving an output from said reproduction amplifier and holding a peak level as of an erase start point, and a level difference detection circuit for outputting an erase failure signal derived from said peak level held in said peak level holding circuit and a reproduction amplitude level during the erasing after a predetermined period of time from said erase start point;

an erase judging circuit for judging whether to skip an erase failure region or to re-erase and verify the erased state when said erase failure signal is outputted from said erase failure detection circuit.

* * * * *

UNITED STATES PATENT AND TRADEMARK OFFICE
CERTIFICATE OF CORRECTION

PATENT NO. : 5,889,744

DATED : March 30, 1999

INVENTOR(S) : Toshiaki Iwanaga

It is certified that error appears in the above-identified patent and that said Letters Patent is hereby corrected as shown below:

```
On the title page,item [54] Col 1 after "Device" delete "AND".
```

Signed and Sealed this

First Day of June, 1999

Attest:

Attesting Officer

Q. TODD DICKINSON

Acting Commissioner of Patents and Trademarks